July 6, 1937.   G. BRION ET AL   2,085,735
APPARATUS FOR EFFECTING IONIZATION IN GASES
Original Filed Nov. 30, 1931   3 Sheets—Sheet 2
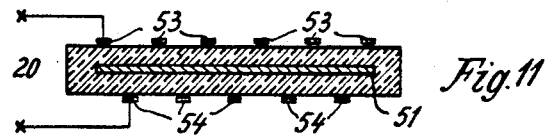
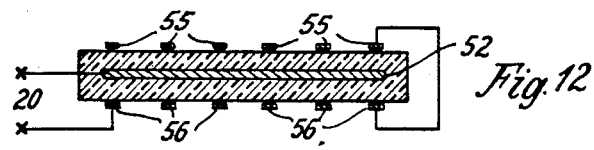
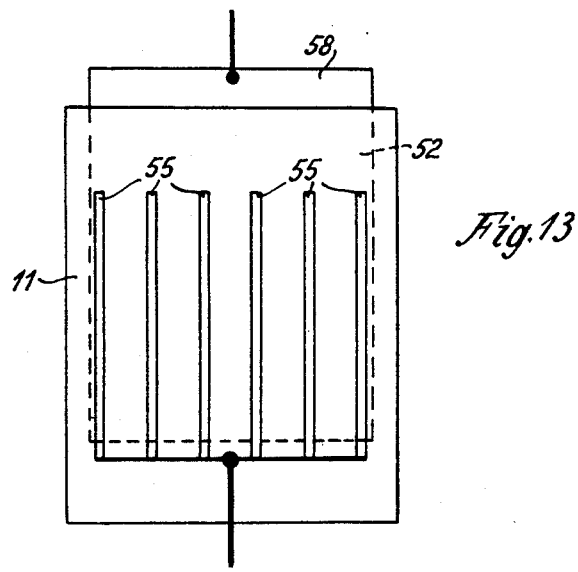
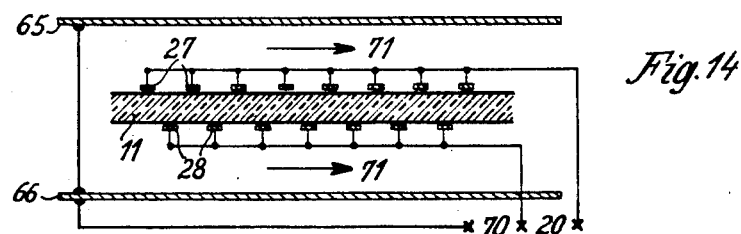
INVENTORS
Georg Brion and
Arthur Johannes Krutzsch.
BY Bean, Brooks & Henry.
ATTORNEYS July 6, 1937.  G. BRION ET AL  2,085,735
APPARATUS FOR EFFECTING IONIZATION IN GASES
Original Filed Nov. 30, 1931   3 Sheets-Sheet 3
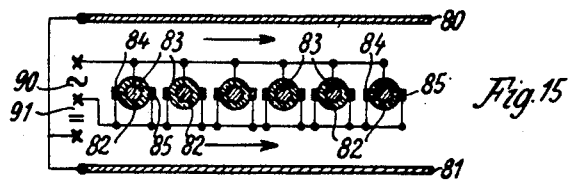
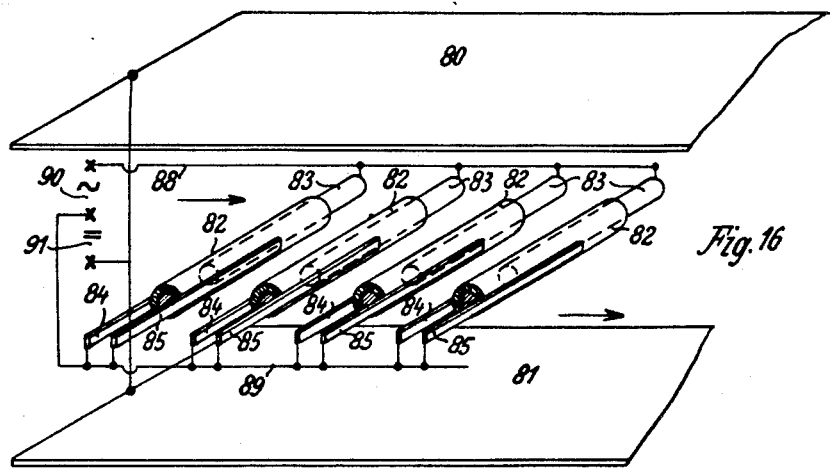
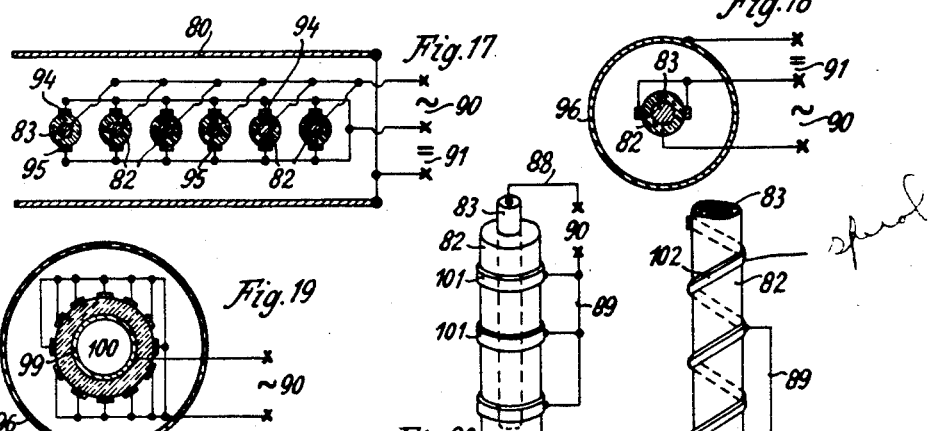
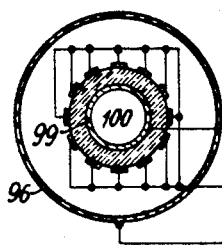
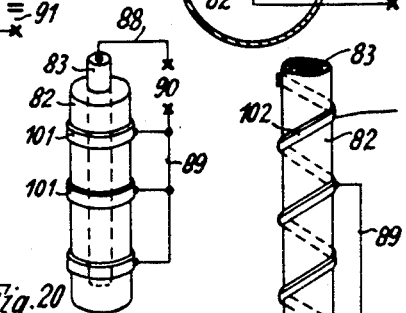
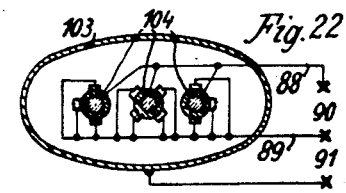
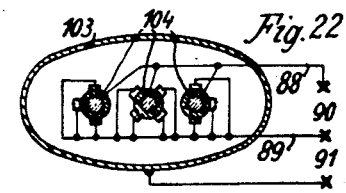
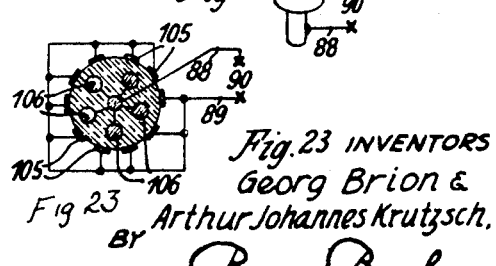
INVENTORS
Georg Brion &
Arthur Johannes Krutzsch,
BY Bean & Brooks
ATTORNEYS.

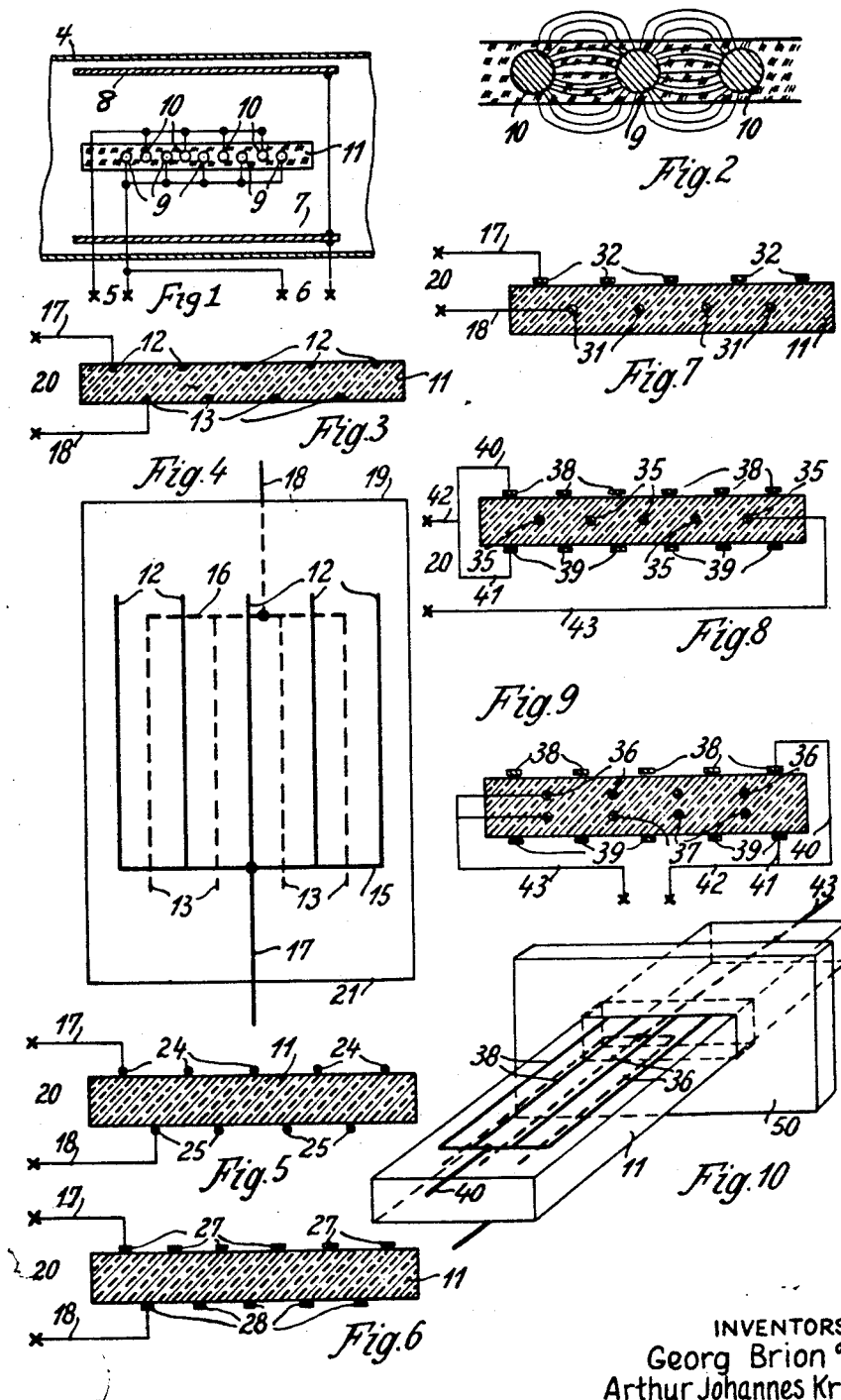

Patented July 6, 1937

2,085,735

UNITED STATES PATENT OFFICE 2,085,735

APPARATUS FOR EFFECTING IONIZATION IN GASES

Georg Brion, Freiberg, and Arthur Johannes Krutzsch, Munich, Germany, assignors to International Precipitation Co., Los Angeles, Calif.

Application November 30, 1931, Serial No. 578,165
Renewed October 15, 1936. In Germany December 4, 1930

6 Claims. (Cl. 183—7)

This invention relates to a new or improved arrangement for the production of ionization by impact, which is particularly valuable for electrical gas purifying plants, in which the strength of the field required for ionization by impact is produced by means of a voltage produced in a zone situated at the side of the charging and separating zones, and the charge carriers so formed are conveyed by means of another voltage into the charging zone.

The invention permits of the production of large ionization surfaces which are cheap in manufacture and reliable in action and in particular are proof against sparking across and in which an intense and uniform ionizing layer or zone can be produced with comparatively low voltages. At the same time the invention permits of the construction of plants of any desired size without there being any risk of the action of the surfaces being impaired by the deposit of large quantities of dust thereon.

The arrangement also permits of a favourable superimposition or stratification of the fields required for the carrying out of the gas purifying process and produced by different voltages. This secures an excellent utilization of the ionizing area and consequently a comparatively low consumption of energy and but little electrical strain on the material.

According to the invention the superficial impact ionization area is produced at the boundary or surface of a layer, preferably a plate, composed of insulating material, which separates the ionization electrodes of the different polarities from each other.

The idea on which the present invention is based may be carried out in various ways. In preferred embodiments of the invention the ionization electrodes are constructed in the form of rods or linear conductors and lie on or in the vicinity of the surface of plates or other bodies composed of insulating material.

In a further preferred embodiment of the invention the layer of insulating material, which separates the ionization electrodes of the different polarities is made cylindrical. The ionization electrodes of the one polarity may in such case form the core or an external jacket of a cylinder or of a tube composed of insulating material, on the external jacket surface of which the conductors of the other polarity, preferably of linear form, are arranged. One electrode or several electrodes or one series of one polarity of the ionization electrodes or both series may be embedded near the surface in the layer or the plate or other body composed of insulating material; or ionization electrodes may be arranged on the surface of the layer of insulating material, and the electrodes may be attached thereto in a suitable manner. The electrodes may consist of conducting material of any desired cross section, and they may also be attached to the surface as thin conducting layers by spraying, burning, painting or may be laid on or cemented on or otherwise applied. On the other hand it is also possible to arrange the ionization electrodes partly within the layer at a greater depth, partly within the layer either near or on the surface thereof. The electrodes may be constructed in the form of rods, strips, grids, nets, plates or the like. Any suitable non-conducting, badly conducting or semi-conducting material may serve as the material for the insulating layers, such for example as glass, porcelain, stoneware, clay, fire clay, cement, concrete, slate, steatite, mica or other mica or resin products or rubber products; also hard paper or any other natural or artificial insulating material. The badly conducting substances may be solid but may also be liquid, in which case they are kept in the form of layers in a suitable manner as by means of vessels for example.

The invention further resides in the features of construction and the arrangements and combinations of parts hereinafter described in detail and succinctly claimed, reference being had to the accompanying drawings, wherein:

Fig. 1 shows in section a dust precipitating arrangement according to this invention.

Fig. 2 shows a detail of Fig. 1 on an enlarged scale,

Figs. 3 and 4 show in section and elevation respectively an arrangement according to this invention, in which rod-shaped conductors are embedded in a plate of insulating material near the surface thereof.

Figs. 5 and 6 show arrangements in which conductors are arranged on the surface of a plate of insulating material.

Figs. 7 to 9 show in section, and

Fig. 10 in perspective arrangements in which rod-shaped or linear conductors are arranged on the surface as well as in the interior of the plate.

Fig. 11 shows in section an arrangement with rod-shaped conductors on the surface of a plate of insulating material and with a plate-like body of conducting material within the plate of insulating material.

Fig. 12 shows a similar arrangement in section, and

Fig. 13 the same in elevation, in which the plate-like body electrically connected within the insulating body acts as an electrode.

Fig. 14 shows another example of the application of this invention to a dust precipitating plant.

Figs. 15 and 16 show in section and in perspective a dust precipitating apparatus, in which the body of insulating material is constructed in the form of a tube.

Fig. 17 shows a modification of this arrangement in section while

Fig. 18 shows an arrangement in section with tubular precipitating electrodes.

Fig. 19 shows a further modification of this arrangement in section, while

Figs. 20 and 21 show in perspective two modifications of the arrangement of the outer ionization electrodes on a tubular or cylindrical ionization body.

Fig. 22 shows in section a further modification of a precipitating arrangement, in which the precipitating electrode is a tube being elliptical in cross section while finally Fig. 23 shows a modification of a cylindrical ionization body, which has a number of ionization electrodes internally and externally.

In Fig. 1 the electrode plates 7 and 8 of the charging and precipitating voltage respectively are arranged in a conduit 4 for passing the gases to be purified. Between these plates are arranged in the examples shown rod-shaped electrodes 9 and 10. To these electrodes voltages are supplied, and the voltage 6 supplied to the charging and precipitating plates 7 and 8 respectively may be completely separated from the voltage 5 supplied to the ionization electrodes 9 and 10 or may be inter-linked therewith, as shown in Fig. 1.

An ionization electrode or one of the two series (9) of ionization electrodes may therefore act simultaneously as an electrode of the charging and separating voltage respectively. Simple methods of connection can then be obtained if the two charging and precipitating plates are connected up in parallel as in the arrangement shown in Fig. 1. If the voltages are supplied to the electrodes separately, it is advantageous to select by suitable connection, interlinking of transformers or otherwise the potentials in such a way that the mean potential of the ionization electrodes lies between the charging and separating potentials.

In all these examples the ionization electrodes may be of any desired form; preferably they will be constructed in the form of rods. With flowing gases to be purified, these rod-shaped conductors may be laid either longitudinally of or at right angles to the direction in which the gas flows between the electrodes of the charging and separating voltage respectively. The space or zone included between the charging and separating electrodes, such as the space or zone between electrodes 7 and 8, as shown in Fig. 1, through which flows the gas to be purified, constitutes the charging and separating area or zone, since it is here that the gas to be purified flows and is charged and in which non-gaseous matter is removed or precipitated.

In the embodiment shown in Fig. 1 the two series 9 and 10 of ionization electrodes are embedded in a layer or plate 11 of suitable insulating material or semi-insulating material. Fig. 2 shows the ionization field, which is produced when voltage is supplied to the series 9 and 10 of conductors. It traverses partly both the solid dielectric and also the gas. If the distance of the linear conductors 9 and 10, the thickness of the plate 11 and the strength of the voltage are suitably selected, ionization is produced in the gas along the boundary layer between the gas and the badly conducting material, this zone constituting the impact ionization area or zone. By suitable selection of the conditions it is possible to adjust the uniform distribution of the ionization over the entire surface and at the same time to control the intensity thereof. As a further means of adjustment the selection of the dielectric constants of the layers, their conductivity and also the shape, kind and nature of the boundary surface may serve.

Figs. 3 and 4 show in cross section and elevation a plate 11 composed of insulating material in which the conductors 12, 13 of both polarities of the ionizer, are embedded on both sides near the surface. The conductors form a grid or fork and are each connected at one end by means of the conductors 15 and 16 respectively to a series of conductors connected up in parallel. The conductors 17, 18 which are connected to the cross connections 15 and 16 respectively and lead to a suitable main 20 act as the return conductor. If an alternating current voltage is supplied to the conductors 17, 18, fields are produced, which partially traverse the dielectric, and pass partially on the surface of the insulating layer or plate. If a sufficiently high voltage is selected, the so-called polar brushes or jump-over-sparks are produced, which alternately charge and discharge the two sides of the insulating layer electrically. In this way the surface of the insulating layer is coated, in the example shown, on both sides with an intense and uniform ionization layer. According to the selection of the voltage serving for ionization the electrodes of the series will be placed more or less close to each other, so that the ionization may take place under favourable conditions and with a comparatively small expenditure of energy and that it may uniformly cover the surface of the ionizer.

In order to avoid the risk of sparking across between the electrodes of different polarities, the cross connections 15 and 16 may be arranged at sufficiently wide distances from the adjoining edge of the plates 19 and 21 respectively. The plates may be produced in any desired manner by simple means. According to the conditions prevailing they may be cast, pressed or formed in any other manner. They may be made of any desired size, so that they can directly be adapted to the particular purpose for which they are to be used. So, they are particularly suitable as ionizers for dust precipitating plants, in which the charging of the particles to be separated takes place by impact ionization and the strength of the field required for the impact ionization is produced by means of a voltage in a special zone situated at the side of the charging and separating zones and electrical charge carriers thereby are formed, while one or more other voltages which do not serve for ionization convey the charge carriers into the charging zone and there precipitate the charged particles. The ionizers according to this invention may be made of any desired dimensions for these dust precipitating plants and may consist of single plates or be combined of plates, so that they can be used for dust precipitating plants of any desired size and for any desired condition. As at the same time an intense ionization is possible, and favourable conditions result also for the precipitation of the charged particles, very effective plants result, which permit the particles of dust to be separated over a comparatively short course.

Whereas in the embodiment shown in Fig. 3 the conductors lie inside the insulating layer near the surface thereof, in the example which is shown in Fig. 5 in cross section, the series of conductors 24, 25 are arranged on the surface.

Fig. 6 shows an example in which the conductors are applied to the surface preferably as thin strips, in this example in two series 27, 28 by a suitable process as indicated above.

Whereas the examples hitherto described show arrangements in which the ionizer is constructed towards both sides symmetrically and acts symmetrically, Fig. 7 shows in cross section an example of an ionizer in which the ionizing action takes place towards one side only. In this case the ionization electrodes consist partly of conductors 31 arranged within the plate at a greater depth and partly of conductors 32 which lie on the surface of the insulating layer or may also be embedded therein near the surface.

Figs. 8 and 9 show in cross section symmetrical arrangements in which the ionization electrodes lie partly in the interior of the insulating layer in a series 35 (see Fig. 8) or also in two series 36, 37 connected up in parallel for example (see Fig. 9), while another part of the ionization electrodes 38, 39 is arranged on the surface of the insulating layer. In this case conductors arranged on the surface or near the surface are connected up in parallel across the conductors 40, 41 and lead to a conductor 42 of the mains, while the other conductor 43 leads to the conductors embedded more deeply in the insulating layer.

In order that the point where the electrical conductors are taken to the conductors which lie deep in the insulating layer, is safeguarded against any risk of sparking across, the ends of the conductors 38 and 39 respectively—and correspondingly in the other arrangements—may be screened off by a collar 50 from the part 43 of the middle conductors as shown in perspective in Fig. 10. Instead of this collar the plate of insulating material may be thickened at the end or be provided with grooves or channels, expedients which are all well known per se in high tension practice.

Figs. 11, 12, and 13 show in cross section and elevation respectively an arrangement in which the insulating layer has embedded in it an electrically conducting layer, for example a hollow space filled with conducting dust or liquid or a plate of electrically conducting material, so that the section between the electrodes on both sides of the surface of the insulating layer is divided up by one or eventually by a series of conducting layers. In this way the development of the field at the surface of the ionizer is strengthened and the risk of surface discharges or creeping discharges between the conductors of different polarities is effectively lessened. These conductors which divide up the section between the outer electrodes and which may be constructed in the form of plates or also rods, grids, nets or the like, may be connected to the voltage or not connected to it. In the example shown in Fig. 11 the plate 51 is not connected, while the electrodes connected to the voltage are formed of the series of electrodes 53, 54, which are located on the surface.

In the embodiment shown in Fig. 12, on the other hand, the plate 52 forms one electrode of the ionizer, while the series of electrodes 55, 56 connected up in parallel on the surface of the insulating plate form the second electrode of the ionizer. The connection to the plate may be made in this example by making the plate emerge at the side at 58 from the insulator as shown in Fig. 13 as an elevation of Fig. 12.

In those symmetrical arrangements in which conductors are arranged at a depth in the insulating layer, the individual conductors will generally be arranged in the same kind on the surface of the insulating layer, as shown by the conductors 38, 39 in Figs. 8 and 9, while in cases in which no conductors are embedded in the insulating layer, but only conductors arranged on or near the surface of the insulating layer are used, the conductors may be echeloned, as shown by the series of conductors 12, 13 and 23, 24, and 27, 28 respectively in Figs. 3 to 6.

Fig. 14 shows the arrangement of an ionizer of the kind according to this invention, for example as shown in Fig. 6, in a dust precipitating plant. The precipitating plates are denoted by 65, 66. A continuous voltage or a slowly pulsating alternating voltage is supplied to them from the main 70 while the ionizer is fed from the alternating current main 20. In the example shown the voltages are so interlinked that the main potential of the ionizer differs from the potential of the separating plates, so that a continuous voltage field exists between the ionizer and the separating plates. This is obtained by interlinking continuous voltage and ionizer alternating voltage. For this purpose for example in the arrangements of Figs. 3, 4, 5, 6, 7, 11, and 14 the one continuous voltage pole may be laid at the middle of the secondary winding of the ionizer transformer; in the arrangement shown in Figs. 8, 9, 12, and 13, on the other hand, the continuous voltage pole may be taken to the outer coatings of the ionizer plates for example.

The charge carriers produced by the ionizer plates by impact ionization are conveyed by the field which exists between the electrodes 65, 66 and is superimposed upon the ionization field, through the charging area lying at the side of the ionizing area towards the precipitating electrodes. During this way of the carriers of electricity the particles which float in the gas flowing between the precipitating electrodes, for example in the direction indicated by the arrows 71, will be charged and pass, under the influence of the field existing between the electrodes 65, 66 or a special field, to the precipitating electrodes.

Instead of the arrangement of ionizer illustrated in Fig. 14 any other desired arrangement of ionizer according to the present invention may be used, just as the ionizers according to this invention may be used in any kind of dust precipitating plants or in arrangements working under similar conditions.

Figs. 15 to 23 show further developments of the invention, which are particularly valuable when great demands are made on the mechanical strength and in particular on the power to resist temperatures of the elements used in the arrangement, when for example chambers of large dimensions are used for treatment or when the purification of gases at a high temperature, such as flue gases for example, has to be carried out.

According to this development of the invention the layer of insulating material, which separates the ionization electrodes of the different polarities, is made cylindrical and in particular tubular. Cylinders or tubes of high grade ceramic material, such as porcelain or difficultly fusible glasses or other fusible substances may be employed for the layer which separates the ionization electrodes; the usual insulating products of electrical industry, particularly mica products of all kinds, artificial resins, particularly condensation products like bakelite, may be used also.

The tubular insulating bodies surround, in a preferred embodiment of the invention, the ionization electrode of the one polarity as a core or an internal lining, while the conductors of the other polarity, which are preferably made in the form of linear conductors, are arranged on the outer surface of the insulating body. The external conductors may be constructed in any desired manner and be attached to the outer surface of the insulating tubes or cylinders in any desired way. The conductors, preferably linear ones, may also surround singly or in numbers in the form of rings or helically the outer surface of the cylinder or tube of insulating material or any other body.

Fig. 15 shows in cross section and Fig. 16 in perspective, an arrangement according to this invention, in which ionization bodies according to this invention are arranged in numbers between plate-shaped electrodes 80, 81 along a plane parallel with the plate-shaped precipitating electrodes and over which plane they are distributed. The tubular, insulating intermediate layers 82 have a rod-shaped core 83 of conducting material such as copper, bronze, or the like for example, which are connected by the conductor 88 to one terminal of a high tension alternating current main 90 for example. On the outside of the tubes 82 of insulating material are each arranged two conductors 84, 85 which lie diametrically opposite each other and which being connected in parallel with each other are connected to the other terminal of the alternating current main 90 by the conductor 89. Between the electrode 83 on the one hand and 84, 85 on the other hand a strong ionization field is thus produced, which fills the portion of space lying at the side of the charging and separating areas and being formed by the layer of ionization bodies distributed over a surface. By means of the continuous current field produced between the precipitating plates 80, 81 connected in parallel and the layer of the ionization body by a continuous current the electrons or other charge carriers formed at the ionization bodies will be conveyed into the space charging area at the side of this layer, and will charge the particles floating in the gas which flows for example in the direction indicated by the arrow, which particles will then be precipitated on the precipitating electrodes under the action of the fields which exists in this area.

Whereas in the example shown in Figs. 15 and 16 the conductors arranged diametrically on the outer surface of the insulation tubes are arranged in such a way that their plane of connection lies in the plane of the ionization bodies, Fig. 17 shows an arrangement in which the plane of connection of these electrodes 94, 95 is at right angles to the plane of the ionization bodies. This arrangement has the advantage that the point at which the intense ionization is produced lies nearer to that area within which the particles floating in the gas are to be charged. In this case as above described, the ends of the conductors may also be conveniently staggered relatively to the ends of the insulating tubes, as is shown in perspective in Fig. 16, so as to provide cross overs of large area between the electrodes of both polarites.

These arrangements shown in Figs. 15 to 23 can also be used for every kind of construction of precipitating electrodes whether they be plate-shaped or cylindrical or of any other desired form. Figs. 18 and 19 show two arrangements, in which a cylindrical precipitating electrode 96 receives the cylindrical ionization body concentrically. The invention is not limited to arranging only one insulating body between this precipitating tube. The ionization bodies may also be provided in any desired number.

In the embodiment shown in Fig. 18 an ionization body of the kind described with reference to Figs. 15 to 17 is illustrated.

Fig. 19 shows an ionization body for large capacities. In this case the ionization tube 99 has an inner lining 100 composed of conducting material, while the outer conductors of the other polarity, which extend in the direction of the axis of the tube, are arranged in numbers across the periphery of the insulating tube. The external conductors may extend parallel with the axis of the tube, but they may also be arranged in another desired form on the surface of the insulating tube or cylinder.

Fig. 20 shows an example, in which the outer electrodes 101, of which there are a number in the example illustrated, surround the insulating tube in the form of rings. The outer electrodes, which are preferably of linear form, may also as Fig. 21 shows for an electrode 102, be wound helically round the insulating tube 82.

Fig. 22 shows the example of an arrangement in which the ionization electrodes 104 are arranged inside a cylinder 103 of elliptical form.

The internal electrode, too, may be arranged in another way than hitherto shown. Thus for example a number of core electrodes may be embedded in the cylindrical body of insulating material, as shown in the example illustrated in Fig. 23. In this case ten outer electrodes 105 are shown, which cooperate with five internal electrodes 106.

The shape of the internal electrode need not be cylindrical. The internal electrodes may also be of any other desired cross sectional form such for example as quadratic, polygonal, cruciform, or the like.

It will be understood that the invention is not limited to the embodiments described and illustrated by way of example and that various structural changes and modifications may be made without departing from the spirit of our invention, and we desire therefore that the appended claims should be construed in the light of prior knowledge.

Having thus described our invention, what we claim as new and desire to secure by Letters Patent, is:—

1. In apparatus for the ionization of gases, particularly for the electric purification thereof, ionization electrodes, a layer of insulating material continuous between and separating the ionization electrodes, voltage means for inducing an electric field between said electrodes and substantially at the surface of said insulating layer and along said surface, said surface being of substantially greater area than the exposed electrode area, said field having a substantially surface-like form and being of sufficient strength to produce ionization and thus electric charge carriers, other voltage means for inducing a second electric field in a space adjacent said first field, said second field being for propelling said charge carriers into the stream of gas to be cleaned and for charging the particles suspended within the gas and for eventually precipitating them.

2. In apparatus for the ionization of gases, particularly for the electric purification thereof, ionization electrodes, a layer of insulating material continuous between and separating the ionization electrodes, said layer of insulating material being of greater area than the exposed ionization electrode area, voltage means for inducing an electric field between said electrodes and substantially at the surface of said insulating layer and along said surface, said field having a substantially surface-like form and being of sufficient strength to produce ionization and thus electric charge carriers, other voltage means for inducing a second electric field in a space adjacent said first field, said second field being for propelling said charge carriers into the stream of gas to be cleaned and for charging the particles suspended within the gas and for eventually precipitating them, one of the electrodes of said second field having a surface substantially parallel to an ionization surface of the insulating material, an ionization electrode of one polarity being arranged at said ionization surface, said second electric field being established between said one of the electrodes of the second field and the last mentioned ionization electrode, and said field being adapted to attract particles charged by said charge carriers whereby said charged particles are deposited at said electrode.

3. In electrical apparatus for the ionization of gases, a conduit for passing gases, insulating means in the conduit presenting a surface extending longitudinally of the conduit, electrodes of different polarities associated with said insulating means for establishing an ionizing field contiguous to said surface, said surface substantially completely separating electrically the electrodes of different polarities and other electrical means of different polarities and including an electrode substantially paralleling and spaced from said surface, the space between the last mentioned electrode and said surface constituting a charging and precipitating zone wherein non-gaseous matter is removed and precipitated from gaseous matter passed through said conduit.

4. In electrical apparatus for the ionization of gases, a conduit for passing gases, means for establishing in said conduit an electrical ionizing field extending in a plane substantially parallel to the conduit walls and paralleling the path of gases flowing by said ionizing field, and other means for establishing in said conduit a second electrical field with lines of force extending substantially transversely of the path of gases passing through said conduit, said second electrical field directing charges and/or charged particles through said second electrical field and the gases passing therethrough.

5. In apparatus of the class described, a conduit for passing gases to be purified, at least a portion of said conduit comprising an electrode and presenting an electrode surface substantially parallel to the path of gases passing through said conduit, means including said electrode for setting up an electric field with lines of force traversing said path of gases for precipitating and depositing charged particles from said gases, a stationary body of insulating material in said conduit and presenting a surface substantially parallel thereto and spaced therefrom, and means separate from said first mentioned means and including a pair of electrodes associated with said stationary body of insulating material for setting up a second electric field with lines of force substantially parallel to said path of gases, said pair of electrodes being completely separated electrically by said stationary body of insulating material, and said second electric field being of sufficient strength to effect ionization independently of the first mentioned electric field.

6. In apparatus for the ionization of gases, particularly for the electrical purification thereof, an insulator adjacent to which gases to be purified may be passed, a pair of electrodes associated with and substantially completely separated electrically from each other by the insulator, the surface of the insulator adjacent one electrode being substantially greater than the exposed area of said electrode, whereby the impression of different electrical potentials upon said electrodes will cause a field to be formed substantially upon the surface of the insulator for the production of electric charge carriers, and other means of producing potentials independent from said first mentioned potentials for propelling said charge carriers away from said surface.

GEORG BRION.
ARTHUR JOHANNES KRUTZSCH.